United States Patent [19]

Hopperdietzel

[11] Patent Number: 4,826,638

[45] Date of Patent: May 2, 1989

[54] PROCESS OF USING HARDENED ELASTOMER FILLER FOR ELASTOMER MATERIAL

[75] Inventor: Siegfried Hopperdietzel, Selb, Fed. Rep. of Germany

[73] Assignee: Rehau AG+Co., Rehau, Fed. Rep. of Germany

[21] Appl. No.: 73,243

[22] Filed: Jul. 14, 1987

[30] Foreign Application Priority Data

Jul. 15, 1986 [DE] Fed. Rep. of Germany ....... 3623795

[51] Int. Cl.$^4$ .................. B29B 9/06; B29C 47/00; C08J 5/00; C08J 5/54
[52] U.S. Cl. ........................................ 264/28; 241/23; 264/140; 264/211; 264/331.13; 264/DIG. 69; 524/570; 524/571; 524/588; 525/101; 525/105; 525/106; 525/197; 525/474; 528/481; 528/502
[58] Field of Search .............. 264/28, 37, 140, 209.1, 264/211, DIG. 69, 331.13; 241/23; 521/45.5; 524/571, 570, 588, 856, 858; 525/197, 331.7, 331.9, 101, 105, 106, 326.5, 474; 526/335, 279; 528/481, 502

[56] References Cited

U.S. PATENT DOCUMENTS

| | | | |
|---|---|---|---|
| 1,988,902 | 1/1935 | Keppeler | 264/28 X |
| 3,823,223 | 7/1974 | Liska et al. | 521/45.5 X |
| 4,090,670 | 5/1978 | Bennett | 241/23 |
| 4,125,578 | 11/1978 | Sear | 264/DIG. 69 |
| 4,175,396 | 11/1979 | Miller et al. | 62/63 |
| 4,273,294 | 6/1981 | Hollely et al. | 241/23 X |

FOREIGN PATENT DOCUMENTS

| | | | |
|---|---|---|---|
| 342319 | 3/1978 | Austria . | |
| 1078803 | 6/1980 | Canada . | |
| A2133150 | 1/1973 | Fed. Rep. of Germany . | |
| 2815842 | 10/1978 | Fed. Rep. of Germany | 264/211 |
| A2286164 | 4/1976 | France . | |
| 55-45717 | 3/1980 | Japan | 264/140 |
| 880739 | 10/1961 | United Kingdom | 525/197 |
| 1516090 | 6/1978 | United Kingdom . | |
| 2072200 | 9/1981 | United Kingdom . | |

OTHER PUBLICATIONS

Gummi, Asbest, Kunststoffe, vol. 36 (1983, pp. 540–545, L. Slusarski et al., "Der Einfluss . . . ".
International Polymer Science and Technology, vol. 9, No. 10 (1982), pp. T/34–T/38, Elfferdin G. P.

Primary Examiner—Jeffery Thurlow
Assistant Examiner—Leo B. Tentoni
Attorney, Agent, or Firm—Spencer & Frank

[57] ABSTRACT

The invention relates to the use of a fraction of hardened particles of an elastomer material of limited particle sizes between 0.1 and 1 mm, preferably between 0.3 and 0.7 mm. The order of magnitude of the admixture to every 100 parts of unhardened elastomer material lies at 5 to 60 parts, preferably 20 to 40 parts. The admixture of the particles to the elastomer material is effected before the elastomer material hardens and is done to produce a defined, non-smooth surface in end products made of elastomers.

15 Claims, No Drawings

PROCESS OF USING HARDENED ELASTOMER FILLER FOR ELASTOMER MATERIAL

BACKGROUND OF THE INVENTION

It is known to add hardened elastomer crumb material, generally elastomer waste material, as filler to elastomer starting materials before they are hardened. In this way, the hardened elastomer waste material, for which otherwise there would be hardly any use, can be reused in an appropriate manner.

The elastomer waste material is here comminuted, for example, in a cutting mill to produce a fraction of different grain sizes, with the major portion being particles of a size larger than 1 mm and a small percentage of dust is also processed as a non-damaging admixture.

In this way, it is possible to produce, for example, casings for circular struts in conveyor systems in which the adhesive behavior of such an elastomer casing is appreciated. Such casings are produced in an extrusion process and the fractionated ground material is added to the starting material for such an extrusion process in a manner similar to the admixture of a filler. The extruded product is then, for example, a tube composed of the admixed, already hardened particles which are encased in the original starting material so as to form a rough, non-smooth surface in the finished, vulcanized end product.

The drawback of this type of manufacture is that many particles are used which are too large and form coarse raised portions on the surfaces of the finished product that adversely influence the sliding behavior.

SUMMARY OF THE INVENTION

This is where the present invention comes in, which has as its object to provide an optimum fraction and a like admixing ratio of hardened particles of an elastomer material as additive to unhardened, elastomer starting material before the latter is hardened for the production of a defined, nonsmooth surface on the end product. According to the invention, it is proposed that the hardened particles of a particle size from 0.1 to 1 mm, preferably from 0.3 to 0.7 mm, are added to the unhardened, elastomer material in an order of magnitude of 5 to 60 parts, preferably 20 to 40 parts, to every 100 parts of unhardened elastomer material.

DESCRIPTION OF THE PREFERRED EMBODIMENTS

The invention utilizes the fact that the magnitude of the stated fraction results in optimum slidability with optimum gripping capability of the end product. If the particles employed are too large, slidability, as already mentioned, and also the gripping capability of such an end product are adversely influenced. The air gaps developed, for example, between the individual particles are too large so that the good characteristics of an elastomer surface are negatively influenced. If, however, the particles employed are too small, for example in the form of dust, the roughness depth of the surface becomes too small and the air gaps between the individual, enclosed particles on the surface become too small so that their gripping capability is limited or completely absent and slidability is also influenced negatively.

With the claimed particle size, these drawbacks do not appear. The surface of the end product has a roughness which is defined by the particle size, with the defined surface region not being interrupted by either too large or too small particles which would result in the above-described negative effects.

The particle size required for the present invention is realized, for example, by grinding hardened elastomer particles under the influence of low temperatures. Grinding in ball or impact pulverizes in liquid nitrogen at, for example, $-120°$ C. can be employed for this purpose. In this known grinding process, optimum particle sizes can be set so that, in addition to a negligibly small percentage of dust, larger particles than desired are not obtained. Without this cold grinding process, only rough fractionation would be possible, even with the use of ball or impact pulverizers, since the hardened elastomer material, due to its inherent elasticity, resist intentional fractionation. The elasticity inherent in the material is cancelled out by the use of the liquid nitrogen so that the fraction can be produced in the grain sizes defined in the claim. In addition to the cold grinding process, the ground material according to the invention can also be produced by shearing on a grinding mechanism. If economics can be left out of consideration, the optimum particle size can also be produced with the aid of a normal cutting mill. The material obtained in such a machine must then be extracted in the preferred particle size by screening the ground charge.

The mixture according to the invention in the fraction defined as the preferred fraction, which is mixed into the not yet hardened starting material, can be used to produce tubes, sheets and the like in an extrusion process. These tubes can be used, for example, as casings for the movable elements of conveyor systems, for all types of grips and the like. For the movable elements of conveyor systems, the gripping capability of the hardened elastomer material is increased by the defined roughness of the surface without the slidability in these cases being negatively influenced.

Similarly to the moving elements of conveyor systems, the gripping region of an object touched by the human hand can also be covered with a tube produced according to the invention. Here, in addition to its particular gripping capability, the defined, rough surface produces air passage gaps along the circumference of the grip which prevent the hand from perspiring even during longer use of a grip equipped with a tube according to the invention. Additionally, the fraction of hardened particles selected according to the invention and mixed with the starting material, because of its defined surface structure, produces a roughness acceptable to the hand which, even after longer use of the grip, does not produce a damaging abrasive effect on the surface regions of the hand. Such damaging effects would occur, for example, if undefined particles of a very large and very small size according to the prior art were added to such a grip coating. Undefined, large air gaps would then alternate with surface regions which have no or only a very slight roughness. In these regions, perspiration would then form due to the lack of ventilation. Such a grip coating would be impossible to use, for example, on athletic equipment which is often held for several hours almost without interruption.

In addition to an extrusion process, tubes, sheets and the like according to the invention can also be produced in a back-filling process in which the liquid elastomer with the mixed-in particles is spread onto a previously determined surface.

The optimum fraction according to the invention produces end products which have fine, defined raised surface portions resulting in the required gripping capacity and the necessary surface roughness.

The coarse particles of the ground material according to the prior art do not have such surfaces, rather they have irregular particle surfaces which may result, on the one hand, in relatively sharp-edged and, on the other hand, in rounded raised portions on the surface of the end product. This also demonstrates that such particles cannot be used to produce a defined, non-smooth surface on end products incorporating the two special features of gripping capability and ventilation.

The basic material for the manufacture of the end products having the characteristics significant for the invention are elastomers such as silicone and synthetic or natural rubber. The defined fractions of the invention are mixed with these starting materials. In this connection, it is possible to mix the same basic material with the same hardened particles without this constituting the sole manufacturing method. It is likewise possible to mix hardened particles of one elastomer to a starting material of another elastomer. For example, the defined fraction according to the invention of hardened silicone particles may be mixed into the silicone starting material. Or, the hardened fraction of defined particles of rubber elastomers may be mixed with the silicone starting material.

By mixing hardened elastomer particles as defined by the invention into the elastomer starting material, end products are obtained which exhibit unreduced elasticity. The fact is there utilized that in the course of the manufacturing process, the starting material is subjected to a hardening process which assimilates the characteristics of the starting material to the characteristics of the hardened, admixed particles in the fraction according to the invention.

Thus, the end product has the defined, non-smooth surface while retaining without modification the elastomer characteristics of a hardened elastomer product. These final characteristics could not realized by, for example, mixing in non-elastic particles such as quartz, wood and comparable materials.

In experiments it has been found that with the use of a soft set basic material and adding the defined particle fraction according to the invention, less rough surfaces can be realized, while harder set basic materials with the use of a similar ground material produce a rougher surface. Thus, within the scope of the invention, variation of the hardness setting of the basic material, offers a series of different end results. The hardness setting of the ground material can also appropriately influence the end product. For example, a softer set ground material results in smoother surfaces while a harder set ground material can be used to produce rougher, more sharp-edged surface sturctures. A combination of settings of the basic material and the ground material in the particle fraction according to the invention here permits the realization of end products having surface characteristics which can be specifically set for their particular intended use.

I claim:

1. Use of a fraction of hardened elastomer particles comprised of an elastomer material which has been hardened, said hardened elastomer particles having inherent elasticity and having a particle size ranging from 0.3 to 0.7 mm, in an order of magnitude of 5 to 60 parts, as admixture to every 100 parts of unhardened elastomer material before said unhardened elastomer material is hardened, for the production of a defined, non-smooth surface on an elastomer product.

2. The use defined in claim 1, wherein said order of magnitude ranges from 20 to 40 parts.

3. The use defined in claim 1, wherein said order of magnitude ranges from 20 to 40 parts.

4. The process of providing a defined, non-smooth surface on an elastomer product, comprising:

admixing from 5 to 60 parts by weight of hardened elastomer particles having a particle size ranging from 0.3 to 0.7 mm, having inherent elasticity, and being comprised of a first elastomer material which has been hardened to 100 parts by weight of a second elastomer material to form an admixture before said second elastomer material is hardened; and causing the hardening of said second elastomer material in said admixture.

5. The process according to claim 4, wherein from 20 to 40 parts by weight of hardened elastmer particles are admixed.

6. The process according to claim 4, wherein from 20 to 40 parts by weight of hardened elastomer particles are admixed.

7. The process according to claim 4, wherein said first elastomer material and said second elastomer material are comprised of the same elastomer material.

8. The process according to claim 7, wherein said first elastomer material and said second elastomer material are selected from the group consisting of a natural rubber, a synthetic rubber, and a silicone elastomer.

9. The process according to claim 4, wherein said first elastomer material and said second elastomer material are comprised of different elastomer materials.

10. The process according to claim 9, wherein said first elastomer material and said second elastomer material are selected from the group consisting of a natural rubber, a synthetic rubber, and a silicone elastomer.

11. The process according to claim 4, further comprising the step of:

grinding said first elastomer material in a cold grinding process to provide said hardened elastomer particles before admixture thereof with said second elastomer material.

12. The process according to claim 11, wherein said cold grinding process includes pulverizing said first elastomer material at ambient pressure and at a temperature of about liquid nitrogen.

13. The process according to claim 12, wherein pulverizing is accomplished in one of a ball pulverizer or an impact pulverizer.

14. The process according to claim 4, further comprising the step of:

grinding said first elastomer material by shearing on a grinding mechanism to provide said hardened elastomer particles before admixture thereof with said second elastomer material.

15. The process according to claim 14, wherein grinding is accomplished in a cutting mill.

* * * * *